US011460131B2

(12) United States Patent
Alshiha et al.

(10) Patent No.: US 11,460,131 B2
(45) Date of Patent: Oct. 4, 2022

(54) SEALANT INJECTION NUT

(71) Applicant: Saudi Arabian Oil Company, Dhahran (SA)

(72) Inventors: Saad M. Alshiha, Dhahran (SA); Bader M Jarallah, Dammam (SA); Hassan A. Alsalloum, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 203 days.

(21) Appl. No.: 17/018,138

(22) Filed: Sep. 11, 2020

(65) Prior Publication Data

US 2022/0082191 A1    Mar. 17, 2022

(51) Int. Cl.
F16L 23/00    (2006.01)
F16L 23/16    (2006.01)
F16L 23/02    (2006.01)

(52) U.S. Cl.
CPC ........... *F16L 23/165* (2013.01); *F16L 23/003* (2013.01); *F16L 23/02* (2013.01)

(58) Field of Classification Search
CPC ........ F16K 23/165; F16L 23/003; F16L 23/02
See application file for complete search history.

(56) References Cited

U.S. PATENT DOCUMENTS

| | | | |
|---|---|---|---|
| 3,603,616 A | 9/1971 | Smith | |
| 4,073,836 A * | 2/1978 | Harrison | F16L 55/175 264/231 |
| 4,230,348 A * | 10/1980 | Moore | F16L 23/16 285/15 |
| 4,815,994 A | 3/1989 | Hickham, Jr. | |
| 5,061,213 A | 10/1991 | Burroughs | |
| 5,326,292 A | 7/1994 | Brushaber | |
| 6,145,624 A | 11/2000 | Tharpe | |
| 9,303,808 B2 | 4/2016 | Miller et al. | |
| 2015/0204371 A1 | 7/2015 | Hendrix | |

OTHER PUBLICATIONS

Webpage—Steersman stainless steel nut with integral grease fitting—https://steersman.com/html/whatitdoes.html.
Publication—"Discussion Paper for Modifying Pipeline Engineering Standards for Sealant Injection Fittings in Pipeline Valves" by Chisholm.
International Search Report and Written Opinion in a corresponding PCT Application No. PCT/US2021/049749, dated Dec. 7, 2021.

* cited by examiner

*Primary Examiner* — Kevin R Barss
(74) *Attorney, Agent, or Firm* — Leason Ellis LLP

(57) ABSTRACT

Systems and methods for sealing bolted flange joints to stop or prevent leakage are disclosed. The system includes a sealant injection nut. The sealant injection nut generally comprises a threaded nut configured to be threaded onto a stud bolt of a flange joint. The nut is configured to inject sealant into the internal passages of the flange joint. The nut includes a passageway drilled through the sidewall. Fitted to the passageway is a high-pressure sealant-compatible injection fitting and an internal check-valve. Provided within the central cavity of the nut, at the flange-facing end, is a groove that facilitates the flow of sealant injected through the passageway into the passages of the bolted flange. A method is also provided for manufacturing the sealant injection nut. A method is also provided for repairing leaking bolted flange joints using the sealant injection nut.

20 Claims, 8 Drawing Sheets

SEALANT INJECTION NUT

FIELD OF THE DISCLOSURE

The present disclosure is directed to fasteners for bolted joints that connect components in a fluid piping system. In one particular arrangement, the present disclosure describes a nut specifically configured to be used to inject sealant into bolted-joints to mitigate fluid leakage.

BACKGROUND OF THE DISCLOSURE

Bolted flange joints are commonly used to for connecting valves, piping, vessels, exchangers etc. in fluid piping systems such as those used in the oil and gas industry. Leaking joints can be challenging at any given facility. Leaking joints can lead to plant shutdowns, media loss and hazardous conditions. Fixing leaks in flange joints can also require system down time and production loss.

The most common causes of flange leakage can include, uneven bolt stress, improper flange alignment or gasket centering, dirty or damaged flange faces, excessive piping system loads at flange locations, thermal shock or high vibration levels, improper gasket size or material, and improper flange facing.

What is needed are systems and methods for effectively and efficiently fix leaking bolted joints. It is with respect to these and other considerations that the disclosure is presented.

SUMMARY OF THE DISCLOSURE

According to an aspect of the present disclosure, there is provided a sealant injection apparatus to facilitate injecting sealant into a bolted flange joint of a fluid piping system of a type having a stud bolt mounted to a first flange and extending through a through hole in a second flange. The sealant injection apparatus comprises a sealant injection nut, including a metallic nut body having a sidewall with an outer sidewall surface and inner sidewall surface that surrounds a hollow generally cylindrical central opening. The nut body extends between a proximal end and a distal end. Additionally, a portion of the inner sidewall surface adjacent to the distal end is shaped to define a circumferential groove having a width that extends from the distal end toward the proximal end. Furthermore, a portion of the inner side wall surface between the groove and the proximal end is shaped to define threads, wherein, in use, the nut body is configured to be threaded onto the stud bolt and the distal end of the nut body is intended to be tightened against the second flange. Moreover, the sidewall of the nut body is shaped to define a hollow passageway entirely through the sidewall, wherein an internal opening of the hollow passageway is located within the width of the circumferential groove. The sealant injection apparatus further comprises an injection fitting, wherein an internal end of the injection fitting is provided within the hollow passageway and sealingly attached to the nut body and an external end of the injection fitting protrudes from the outer sidewall surface of the nut body. The sealant injection apparatus further comprises an internal check valve provided within the passageway.

According to a further aspect of the disclosure, a method of manufacturing a sealant injection apparatus to facilitate injecting sealant into a bolted flange joint of a fluid piping system of a type having a stud bolt mounted to a first flange and extending through a through hole in a second flange is provided. The method comprises the step of providing a metallic nut. The metallic nut comprises a nut body having a sidewall with an outer sidewall surface and inner sidewall surface that surrounds a hollow generally cylindrical central opening. Additionally, the nut body extends between a proximal end and a distal end, and the inner side wall surface between the distal end and proximal end is shaped to define threads. The method also includes the step of machining a circumferential groove into a distal portion of the inner sidewall surface adjacent to the distal end. In particular, the groove has a width that extends from the distal end toward the proximal end. Furthermore, machining the groove includes removing any threads and material from the inner sidewall surface sufficient to provide the groove with the width and a prescribed diameter.

The method also includes the step of drilling a hollow passageway entirely through the sidewall between the outer sidewall surface and the inner sidewall surface. An internal opening of the hollow passageway is located within the width of the circumferential groove. The method also includes the step of installing an internal check valve and an injection fitting at least partially into the passageway. In particular, an internal end of the injection fitting is provided within the hollow passageway and sealingly attached to the nut body, and wherein an external end of the injection fitting protrudes from the outer sidewall surface of the nut body. Additionally, the internal check valve is provided within the passageway and sealingly attached to the nut body.

According to a further aspect of the disclosure, a method for repairing a leaking bolted flange joint of a fluid piping system of the type having a stud bolt mounted to a first flange and extending through a through hole in a second flange using a sealant injection apparatus is disclosed. The method comprises the steps of identifying the leaking bolted flange joint and an existing nut installed onto the stud bolt at the location of the leak and removing the nut from the stud bolt. The method also includes the steps of providing a sealant injection apparatus, threading the sealant injection nut onto the stud bolt until the distal end of the nut body abuts the second flange and tightening the sealant injection nut against the stud bolt and second flange according to prescribed torque specification. Additionally, the method includes the steps of attaching a sealant injector to the injection fitting of the sealant injection nut and injecting, using the sealant injector and at a prescribed injection pressure, a suitable sealant into the sealant injection nut and into internal passages of the bolted flange joint.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

By way of overview and introduction, the present application describes devices and methods for stopping or preventing fluid leakage from bolted joints. Although the systems and methods described herein are described as being used to stop leaking past bolted flange joints, it should be understood that the exemplary systems and methods can similarly be applied to prevent leaking past bolts, other types of joints, valve bodies and other such components that are commonly found in fluid piping systems.

In accordance with an embodiment, the systems and methods for sealing bolted flange joints includes a sealant injection nut. The sealant injection nut apparatus generally comprises a threaded nut configured to be threaded onto a stud bolt of a flange joint. The nut is specifically adapted to inject sealant materials into the internal passages of the flange joint through which fluid is leaking. As further described herein, the nut is provided with a passageway through the sidewall and fitted to the passageway is a high-pressure sealant-compatible injection fitting and check-valve. A sealant-guiding groove provided within the central cavity of the nut, at the flange-facing end of the nut facilitates the flow of sealant injected through the passageway from within the groove into the flange.

The sealant injection nut facilitates online temporary sealing of a leaking bolted flange joint. The sealant injection nut allows for localized injection of heavy sealant material and facilitates sealant spread through the bolted joint mating surfaces to form a temporary sealing barrier and stop or control leakage.

The nut can be fabricated in different materials and sizes to fit all bolted flanges or joints of various sizes and industrial ratings. The sealant injection nut provides a cost-effective option to solve leaking bolted flanges and joints (e.g., for connecting valves, piping, vessels, exchangers etc.) by enabling localized injection of a suitable sealant compound through the leaking joint to stop or reduce the leak in a safe manner.

Figure 1A:
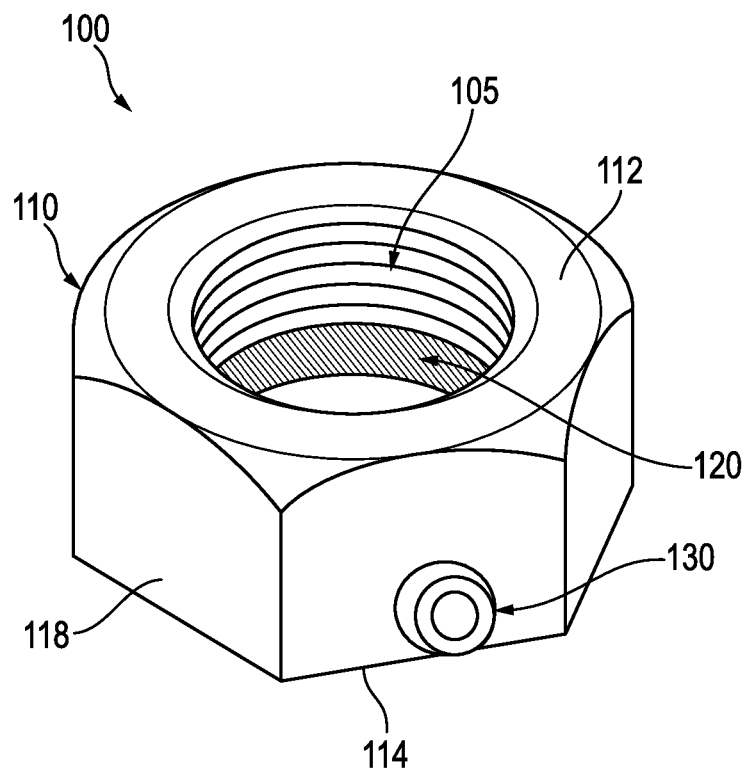
FIG. 1A is a perspective view of an exemplary sealant injection nut according to an embodiment.
Figure 1B:
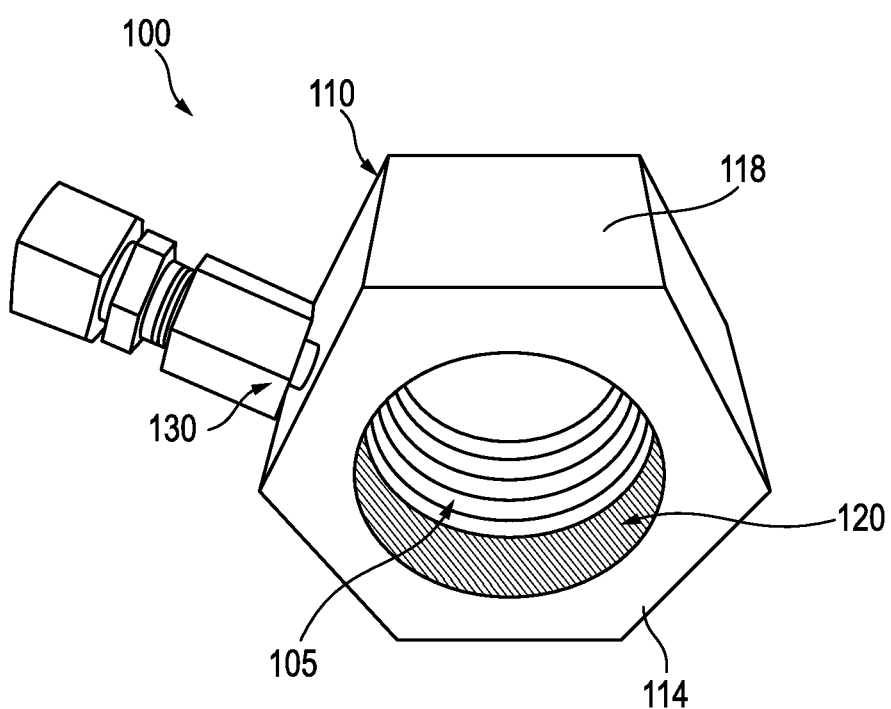
FIG. 1B is a bottom view diagram of the sealant injection nut of FIG. 1A.
Figure 1C:
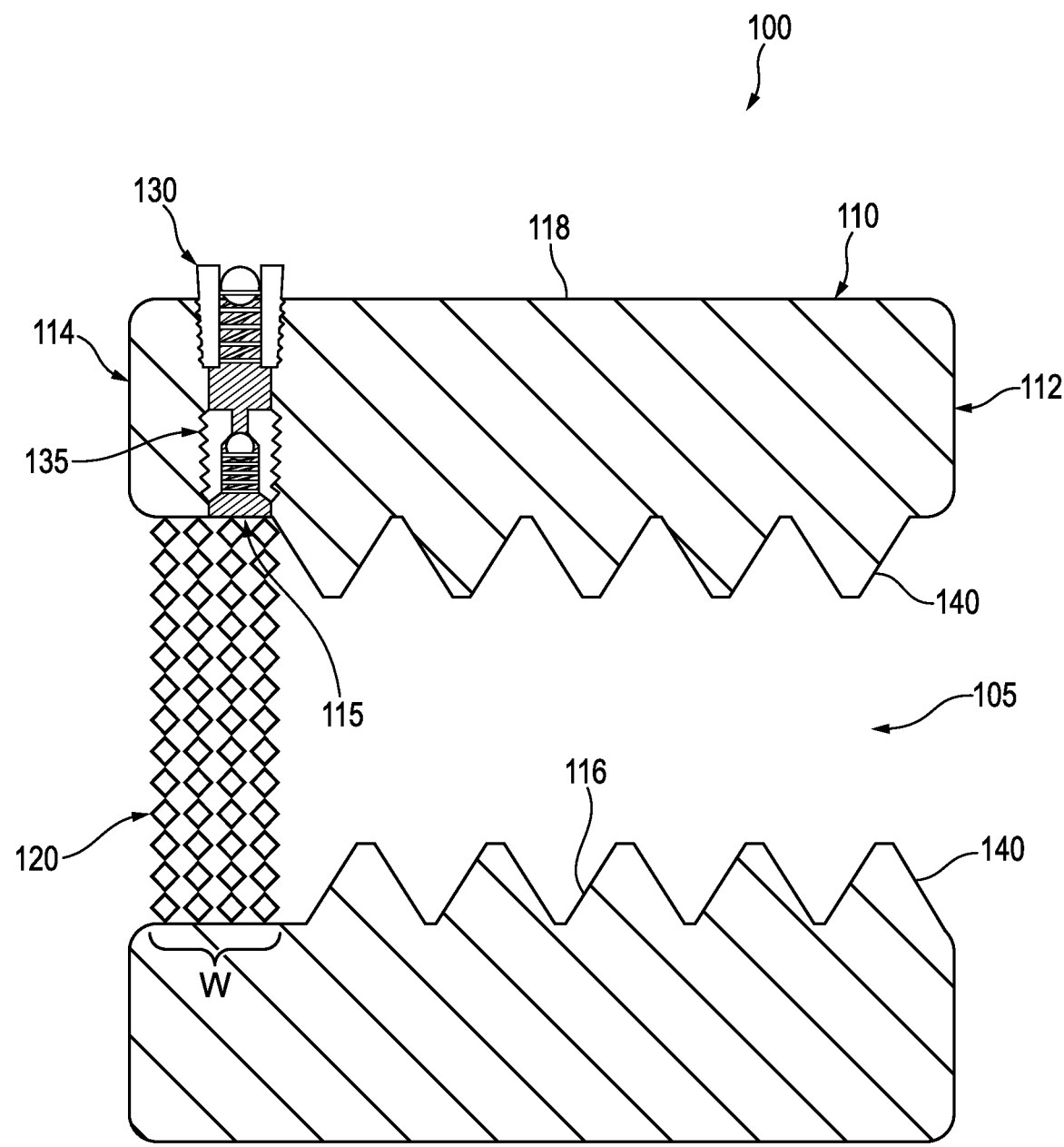
FIG. 1C is a cut-away side view diagram showing a cross-section of the sealant injection nut of FIG. 1A.
Figure 1D:
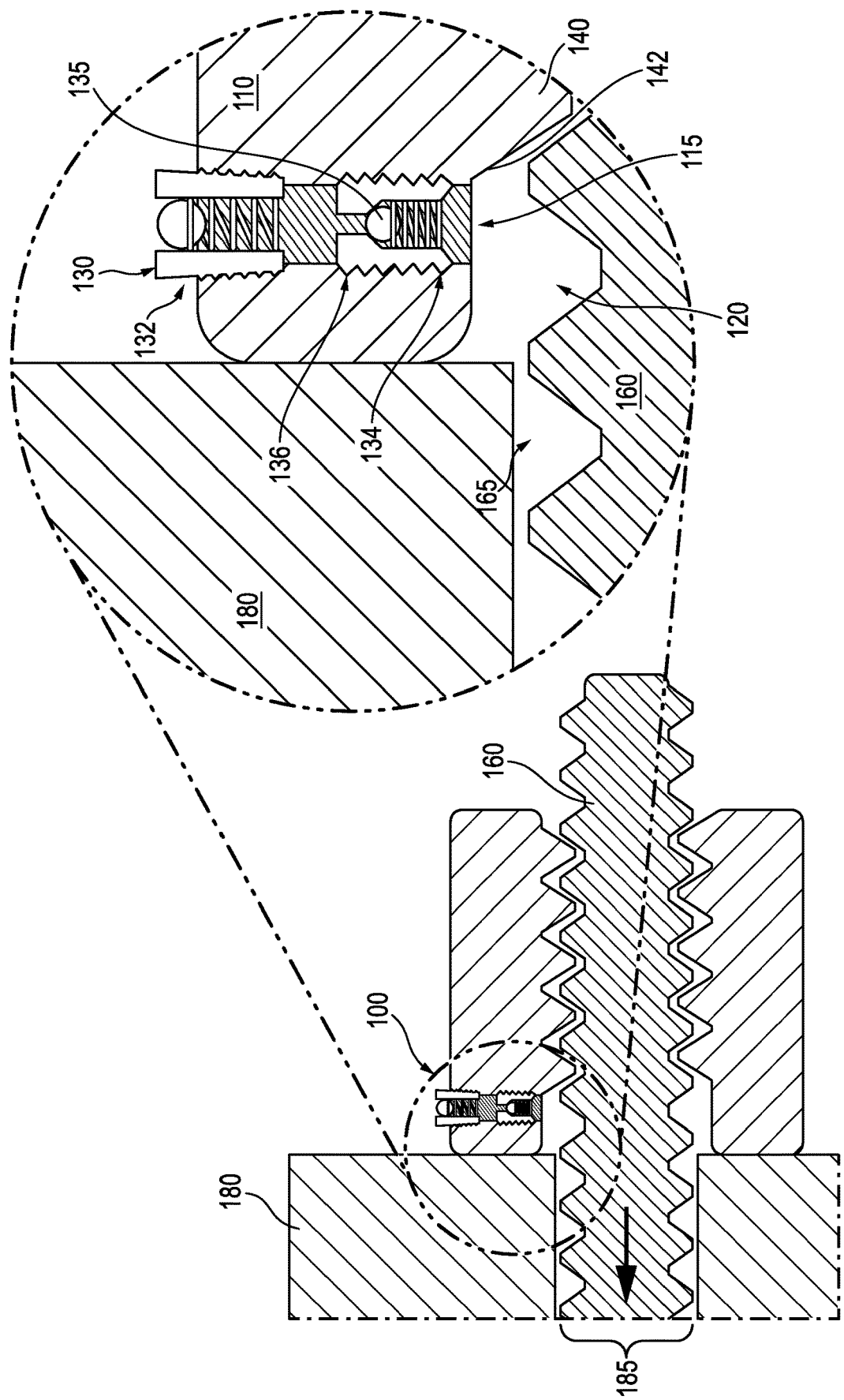
FIG. 1D is a cut-away side view cross-sectional diagram showing the sealant injection nut of FIG. 1A threaded onto a stud bolt extending through the outer plate of an exemplary flange joint according to an embodiment.

FIG. 1A is a top-side perspective view of an exemplary sealant injection nut 100 in accordance with one or more embodiments. FIG. 1B is a bottom-side perspective view of the sealant injection nut 100. FIG. 1C is a cut-away side view diagram showing a cross section of the sealant injection nut 100 as if cut in half along the longitudinal axis. FIG. 1D side view cross-sectional diagram showing the injection nut threaded onto a bolt 160 extending through the outer plate 180 of a pipe flange. FIG. 1D also includes a close-up view of a portion of the sealant injection nut 100 and illustrates its position in relation to the bolt 160 and the flange plate 180 when threaded onto the bolt 160 and tightened against the flange plate.

Figure 2:
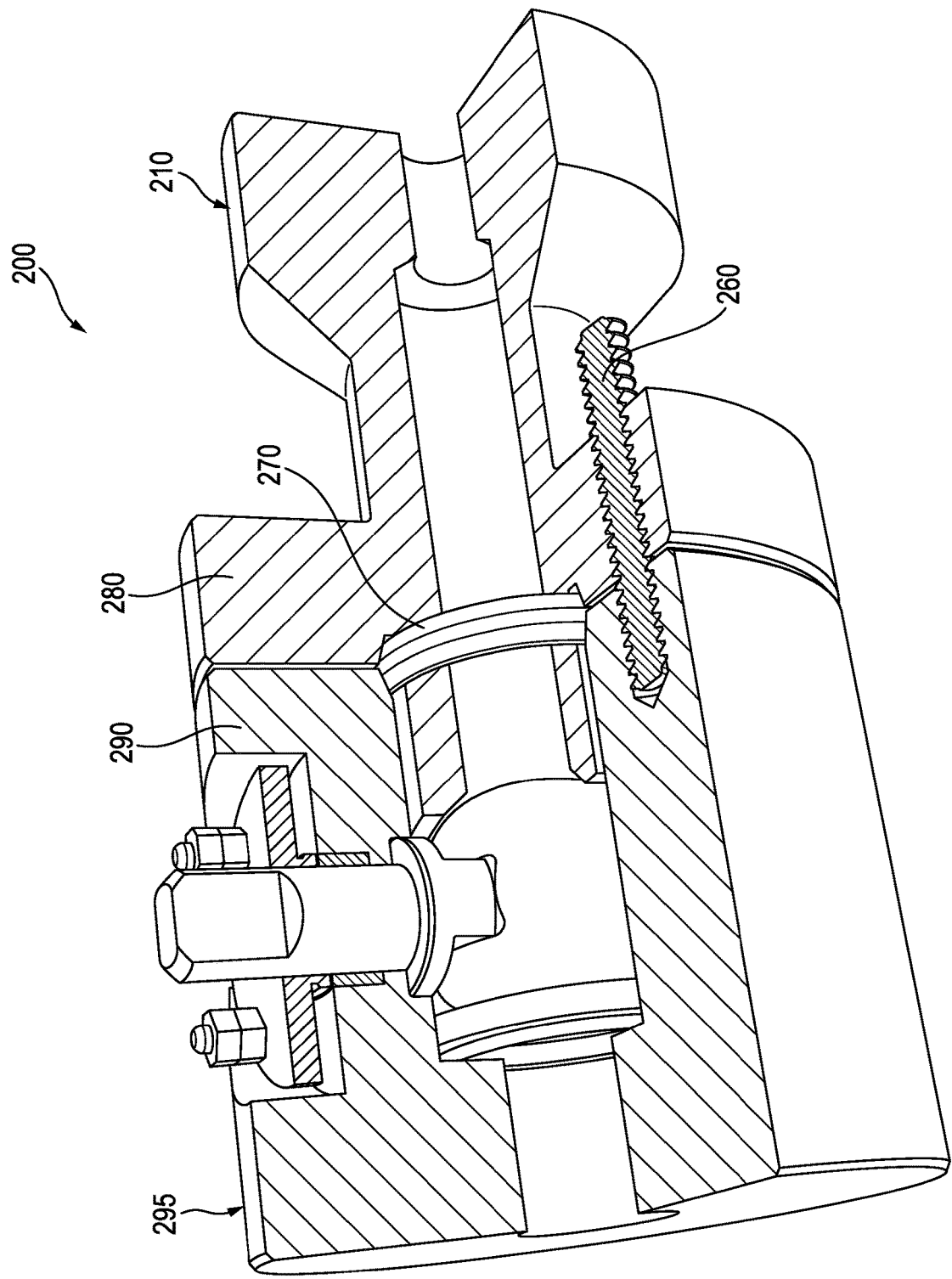
FIG. 2 is a cut-away schematic diagram showing a perspective view of an exemplary valve body including bolted flange joints according to an embodiment.
Figure 3:
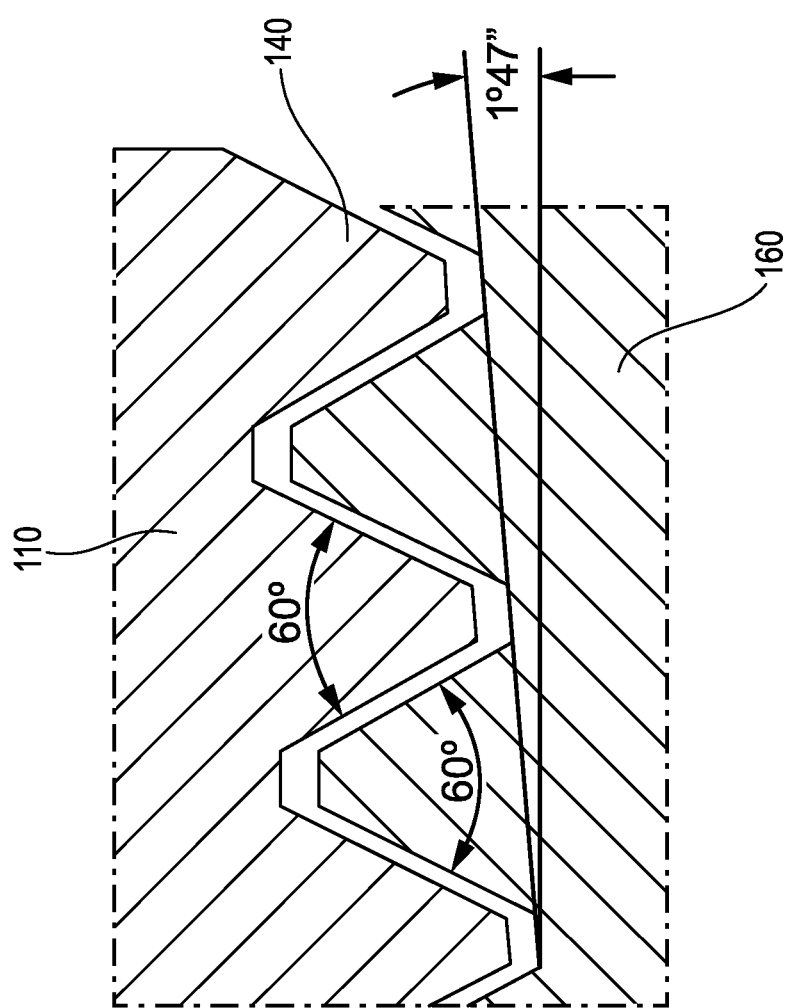
FIG. 3 is a cut-away side-view diagram illustrates an exemplary taper angle for bolt and nut threads according to an embodiment.

For example and context and without limitation, FIG. 2 is a schematic diagram showing a perspective view of an exemplary valve body 200 having a bolted flange joint for connecting the two halves of the valve body. This is just one exemplary type of a bolted joint that the sealant injection nut 100 (not shown in FIG. 2) can be used to seal a leak in the joint. A quarter section of the valve body has been cut-away to reveal the internal components. As shown in FIG. 2, the exemplary valve body includes a first structure 295 and second structure 210, wherein the first structure has a first flange 290 and the second structure has a second flange 280. As would be understood, the mating surfaces of the two flanges are configured to be abutted. Between the mating surfaces is a seal 270 to facilitate sealing and prevent leakage. The mating surfaces of the two flanges are abutted and bolted together thereby sealingly attaching the first and second structures together. More specifically, as shown in FIG. 2, first flange 290 has stud bolts 260 (only one stud bolt shown) mounted thereto and extending from the mating surface. The second flange 280 has through-holes sized and positioned to receive a respective stud bolts 260 therethrough. A nut (not shown) is threaded onto each bolt 260 and tightened against the second flange 280 thereby forcing the two flanges together. Among other causes, deterioration of the seal 270 is one possible cause for leakage through the valve body requiring localized sealing using the sealing injection nut 100 in accordance with one or more embodiments. In practice, when there is a leak in the valve body 200, usually because of gasket 270 failure, fluid in the valve will often leak from the body joint and/or the bolt and nut corresponding to the leakage location. Whereas, for flange leaks, a clamp can sometimes be utilized to contain the leak, there is no preexisting solution to contain the leak due to the fact that valve bodies often have shapes that cannot be clamped. Accordingly, the systems and methods disclose herein provide an effective and more universally applicable solution to fixing leaks.

Returning now to FIGS. 1A-1D, the sealant injection nut 100 comprises a nut body 110. Like a typical threaded nut, the nut body is made of a metal or metal alloy of suitable strength for the intended application. For example, the nut body can be made of hardened steel. The nut body has a sidewall with a thickness extending between an outer sidewall surface 118 and inner sidewall surface 116. The nut body extends between a proximal end 112 and a distal end 114. In the exemplary application for sealing a bolted flange joint described herein, the nut is intended to be installed such that the distal end 114 abuts a flange plate. The nut body is shaped to define a cylindrical central opening extending from the proximal end to the distal end. The inner wall of the nut body 116 is shaped to define threads that, as would be understood by those in the art, enable the nut body to be threaded onto a complementary sized threaded bolt and tightened into place.

Whereas a conventional nut typically has a cylindrical central opening with threads that extend almost entirely between the distal end and opposing proximal end, the internal wall of the nut at the distal end is shaped to define a filling groove 120 having a width W. As a result, the threads 140 extend from the proximal end of the nut to the beginning of the groove.

Provided through the sidewall of the nut body 110 is a hollow passageway 115. The passageway extends from an outer opening located on the outer the side wall 118 to an internal opening located within the groove 120 so as to allowing sealant injected into the passageway to flow into and fill the groove. To facilitate sealant injection, the sealant injection nut 100 further includes an injection fitting 130 of the type that is usable to inject sealant at high pressure into the passageway.

In accordance with one or more embodiments, the sealant injection nut 100 can be based on or used as a replacement of an ASME nut design configured to sustain high pressure (e.g., up to 20000 psi) inside the valve. Accordingly, the sealant injection nut 100 comprises an injection fitting 130 and an internal check valve 135. This set up is aimed to increase the safety and prevent back pressure while injecting the sealant.

The passage is drilled through the sidewall to enable secure installation of the inner check valve 135 and the injection fitting 130. The injection fitting 130 and check valve 135 can be integrated into a single structure or provided separately. For instance, FIG. 1D, which includes a close-up view of the injection fitting 130 and check valve 135, shows the injection fitting and check valve as two separate structures. These safety devices are preferably configured to prevent back pressure from the sealant injection process in which injection pressure can reach up to 7000 PSI or more, as well as leakage pressure build-up from the flange internals being sealed.

As shown, the injection fitting 130 is at least partially provided within the passageway 115. The proximal portion 132 of the injection fitting preferably extends from the outer sidewall 118 of the nut body 110 so as to allow a sealant injecting device to be attached to the fitting. The distal portion of the fitting 134 is located within the passageway. To provide fluidic communication between the sealant injecting device and allow for sealant to be injected into the groove at high pressure, the injection fitting is sealingly engaged with the walls defining the passageway 115. For example, in one exemplary arrangement shown in FIGS. 1A-1D and, particularly in the close-up view of FIG. 1D, threads 136 can be provided on the outer surface of the injection fitting 130 and check valve 135 and at least a portion of the wall defining the passageway 115 can include complementary sized and shaped threads to sealingly mate with the threaded fitting and check valve. Preferably, the injection fittings and internal check valve fittings are sized per industry standards, and thus, all fittings sizes are well known to match.

By way of example and without limitation, an example commercially available injection fitting is the fitting sold under the name Flow Wolf® Quad Seal Fitting by SealWeld Corp. of Alberta Canada. An example commercially available pressurized injection device that can be attached to the injection fitting 135 and used to inject sealant in accordance with an embodiment is the device marketed under the name Valve Serve Sealant Injection Pump (Part No.: AVS-12000) by Valve Serve of Dammam Industrial City, Saudi Arabia. An example commercially available sealant that can be used is sold under the name Valve Sealant AVS XX100 by Valve Serve of Saudi Arabia. Whereas FIG. 1A shows the nut including an injection fitting 130, FIG. 1B further illustrates additional coupling devices for attaching an injection device to the exposed/external end of the injection fitting 130.

As shown in FIGS. 1A-1D and, particularly in the close-up view of FIG. 1D, the fitting 130 can be provided along with an internal check-valve 135 configured to allow sealant to flow in the direction through the passageway into the sealing groove and prevent sealant from flowing in the opposite direction. The exemplary sealant injection nut 100 includes only one internal check valve 135 and one injection fitting 130, mainly to minimize the resistance and in the same time keeping the safety aspect of the process of injecting the sealant. However, it should be understood that additional check valves could be provided. Similarly, the injection fitting can include various internal components such as one or more spring and ball valve assemblies.

As shown, the volume of the groove 120 is bounded by the portion of the inner wall 116 extending from the distal end 114 of the nut body 110 through the shoulder 142 of the first thread 140. The threads 140 are configured to engage the complementary threads of the bolt such that the sealant, which can be a high viscous material, cannot escape or leak between the nut and the bolt in the direction towards the proximal end 112. For example, the threads 140 of the nut body 110 can be designed with a taper to ensure sealing contact between threads 140 and the bolt threads as the nut 100 is tightened. FIG. 2 illustrates an exemplary taper of threads 140 and corresponding threads of the bolt 160 in accordance with ASME bolt standards. As a result, the injected sealant will flow in the direction toward the distal end 114 since the sealant will follow the easiest path with less resistance. Thus the exemplary configuration of, inter alia, the groove and threads will lead to sealant material flowing to the flange internal spaces to overcome the leak.

In accordance with one or more embodiments, the portion of the inner wall 116 that defines the groove 120 can be shaped to provide an opening that is sized and shaped to facilitate the flow of sealant from within the volume of the groove 120 area and into the open spaces 165 between the bolt 160 and the through-hole 185 in the flange 180 that the bolt extends through. As shown in FIG. 1C, the position of the groove at the distal end of the nut and its size and shape is to guide the flow of pressurized sealant travels through the open injection passage space 165 in the direction of the dashed arrow to the leakage location (not shown). As would be understand the flange through-hole 185 has, per design, a minimum clearance between the stud bolt 160 and the flange itself to allow for ease of installation of the flange 180. While this clearance can result in leakage of fluid out of the flange, the clearance provides the injection passage 165 for the sealant compound to flow inward toward the source of the leakage coming out of the flange past the bolt 160.

For example, in an embodiment, the diameter of the groove machined in the nut body 110 toward its distal end 114 is preferably larger than the diameter of the through-hole in the flange 180. As noted, the injection nut 100 is configured to be threaded down the bolt 160 and tightened against the flange 180 such that the distal end 112 of the nut abuts the outer surface of the flange and preferably forms a seal around the through hole. Forming the groove such that the distal end of the groove has a diameter greater than the through-hole facilitates flow of sealant from within the groove into the space between the flange through-hole and bolt. Although the configuration of the sealant injection nut 100 shown in FIG. 1C includes a groove having a diameter that is equal to the diameter of the trough-to-trough diameter of the threads, this is just one exemplary configuration.

Figure 4:
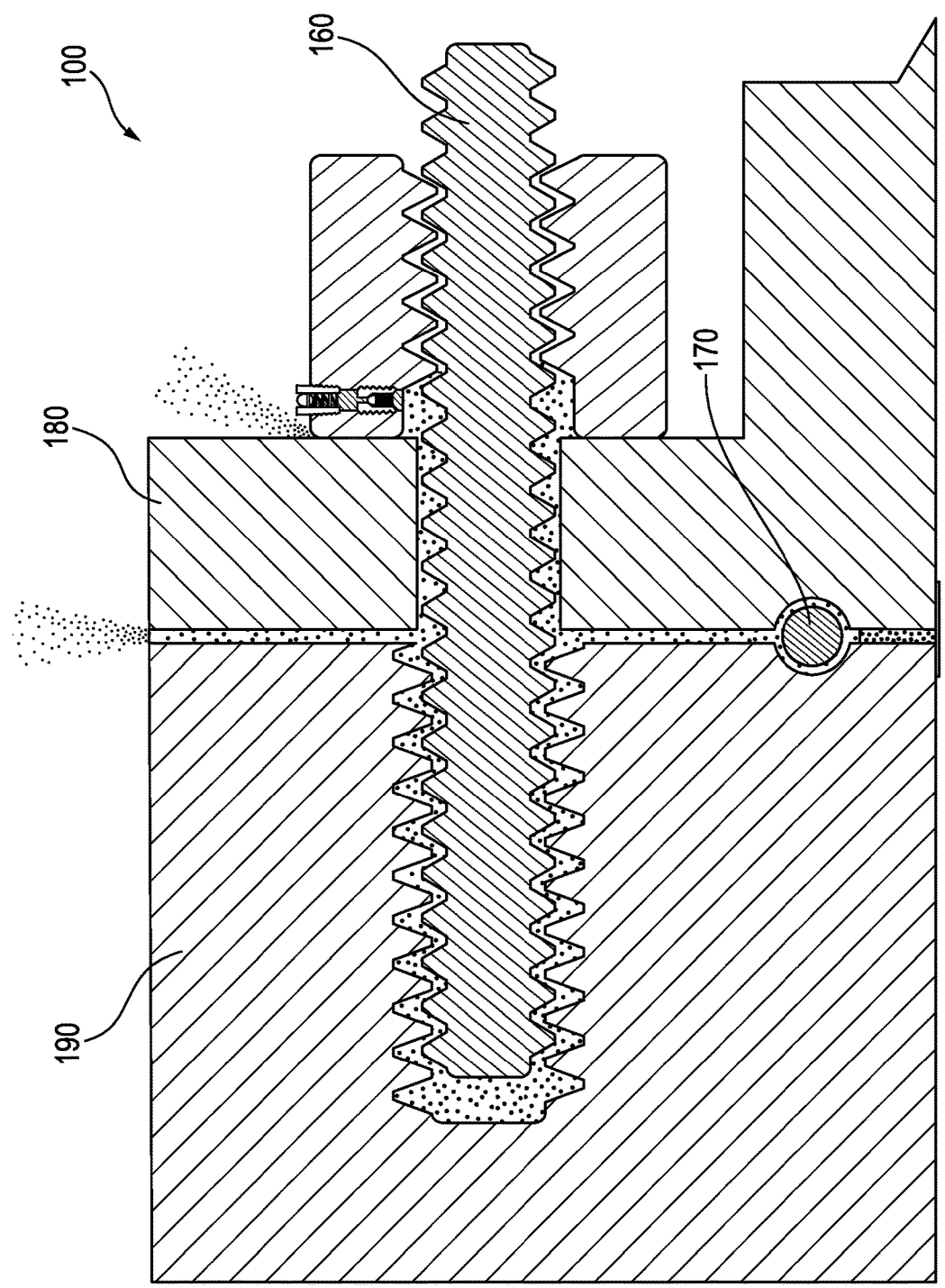
FIG. 4 is a schematic diagram illustrating the sealing function provided by an exemplary configuration of the injection nut according to an embodiment.

Generally, whenever there is a leak originating at a source within a flange joint, there is a fluid passageway between the source and exist through which sealant can be injected. FIG. 4 further illustrates the flow of sealant in an exemplary application of the sealant injection nut 100 for sealing a leak in the internal structure of a flange 180 mated to an opposing flange 190. FIG. 4 is a cut-away cross-sectional side-view of the exemplary sealant injection nut 100, threaded onto a stud bolt 160, which is mounted to the flange structure 190 and extending through the through hole in the flange 180. Also shown in FIG. 4 is the sealing gasket 170. FIG. 4 further illustrates the flow of sealant injected via the injection nut 100 through the spaces between the stud bolt 160 and surrounding flanges 190 and 180 until the sealant reaches the seal 170 (e.g., the cause of the leak). As shown, the pressure with which the sealant is injected can cause the sealant to flow through the interface of the mating surfaces of flanges 190 and 180 to the gasket 170 and outward toward the edge of the mating surfaces. Accordingly, the sealant is distributed in a manner that is suitable to at least temporarily seal various leaks caused by, for example and without limitation, uneven bolt stress, improper flange alignment or gasket centering, dirty or damaged flange faces, excessive piping system loads at flange locations, thermal shock or high vibration levels, improper gasket size or material, and improper flange facing.

Figure 5:
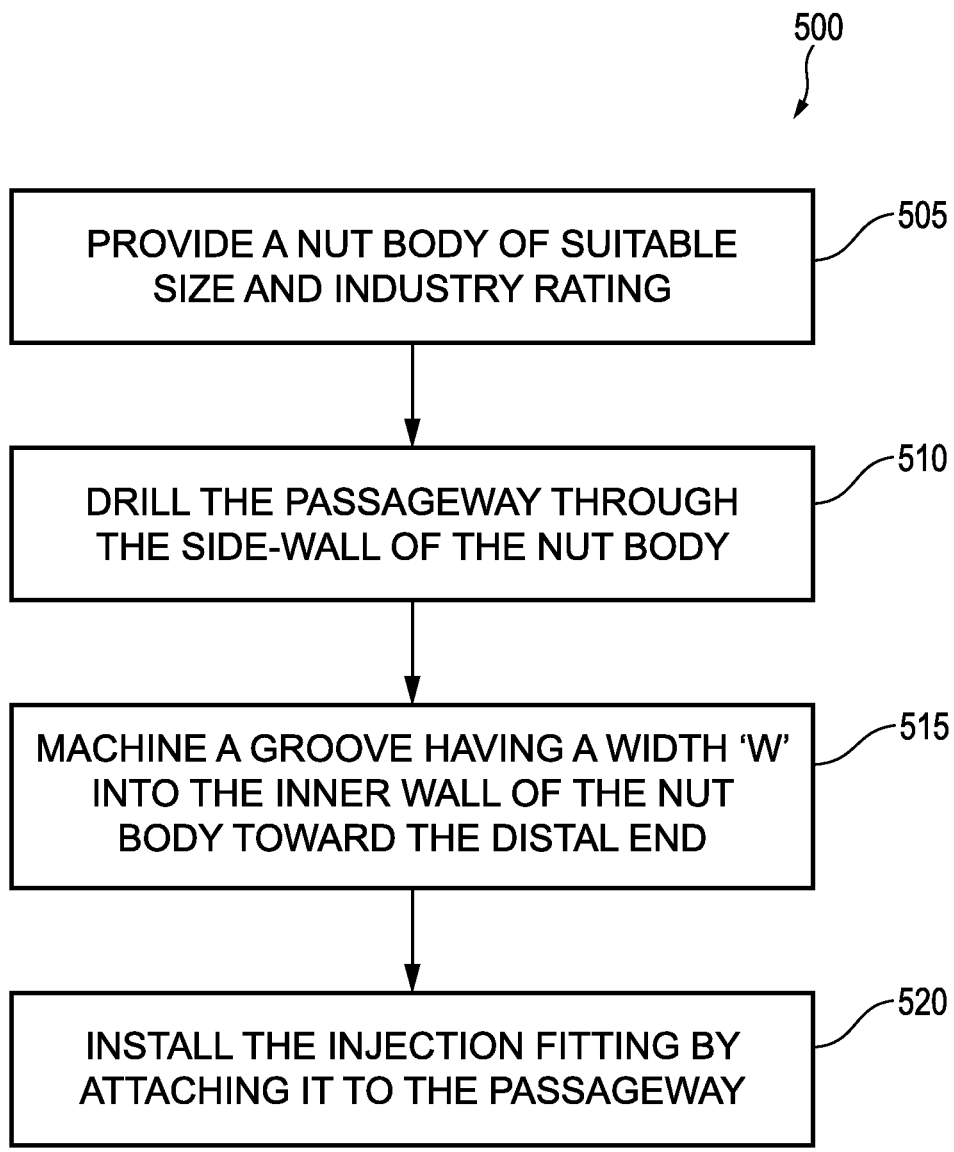
FIG. 5 is a flow chart illustrating an exemplary routine for manufacturing the sealant injection nut according to an embodiment.

FIG. 5 is a process flow diagram illustrating an exemplary routine 500 for manufacturing a sealing injection nut 100 according to an embodiment. The routine 500 begins with step 505 at which point a nut body 110 is provided. As noted, the sealant injection nut can be manufactured from a standard nut body, whether new or used. Accordingly, the nut of a flange exhibiting leakage can be removed and similarly retro-fitted in accordance with the routine 500.

At step 510, the nut body is modified by providing a passageway 115 through the side-wall of the nut body. For instance, a through hole can be drilled through the side-wall perpendicularly to the longitudinal axis of the nut body. As noted, preferably the through-hole is drilled such that the passageway 115 opens into the groove 120, which is provided toward the distal end 112 of the nut body, which is the side positioned against the flange 180. Step 510 can also include tapping the walls of the passageway to provide a threaded surface to receive the threaded injection fitting 130 and the internal check-valve 135.

At step 515, the groove 120 having a width W is formed in nut body. Manufacturing the groove can be achieved, for example, by machining out material from the inner wall of the nut such as pre-existing threads, until a circumferential groove having a prescribed width W, diameter and wall contour is achieved. As noted, the groove 120 is preferably provided at the distal end 112 of the nut. The inner wall of the nut is machined enough to provide a groove with a width W that is suitable to allow for the passageway 115 to provide fluidic communication with the groove and allow fitting installation.

At step 520, the injection fitting 130 and check valve 135 are installed at least partially into the passageway. As noted, this can include threading a check valve 135 into the threaded passageway followed by threading the injection fitting into the threaded passageway so as to sealingly attach the injection fitting 130 and the check valve 135 to the nut body 110. In an exemplary embodiment, the injection fitting is mounted to the nut such that a proximal end of the injection fitting, which is configured to be coupled to the output hose of a sealant injection device, protrudes from the outer side wall of the nut and can be easily coupled to the injection device.

Figure 6:
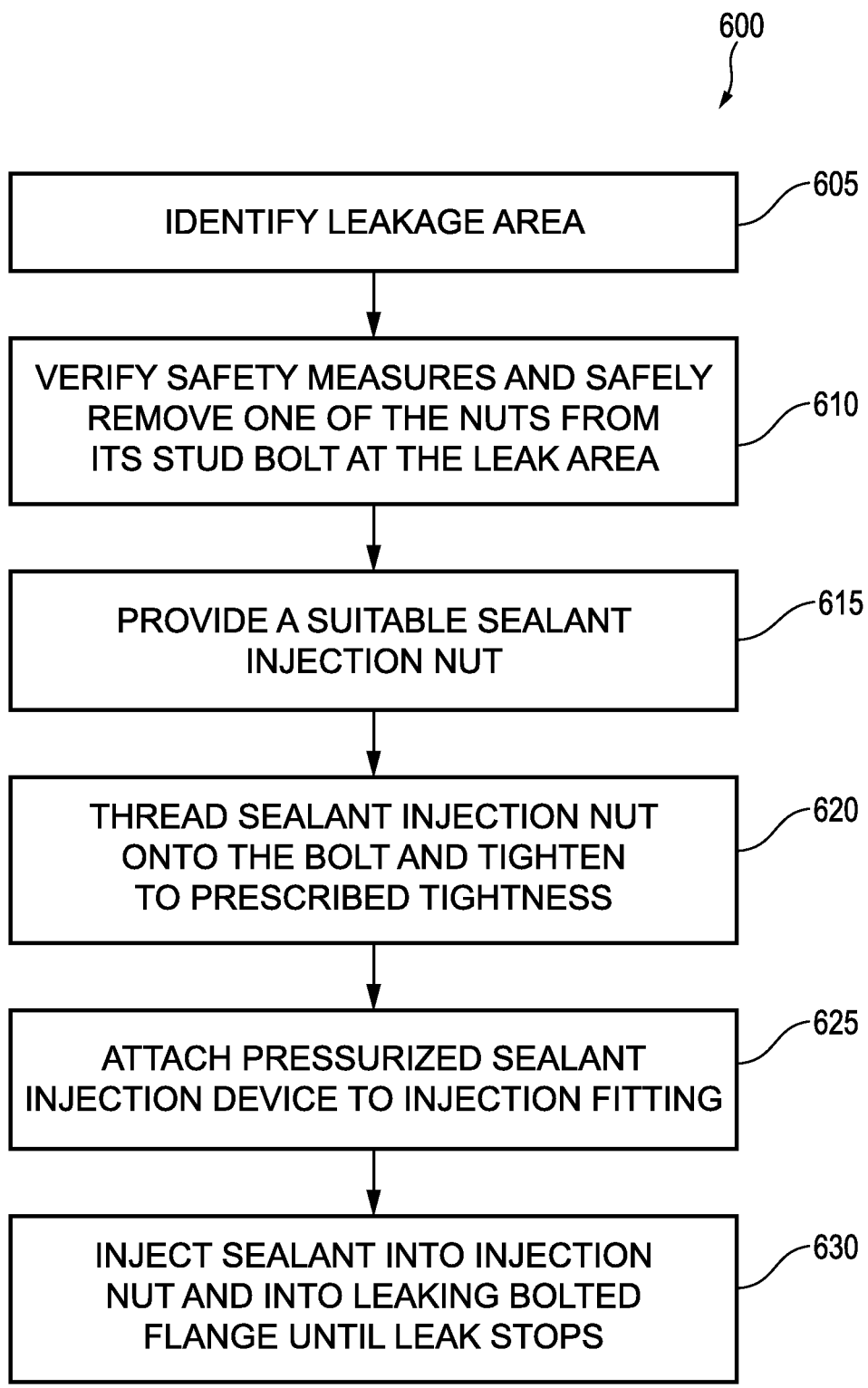
FIG. 6 is a flow chart illustrating an exemplary routine for repairing a leaking bolted flange joint using the sealant injection nut according to an embodiment.

FIG. 6 is a flow-chart illustrating an exemplary routine 600 for localized repair of a leaking bolted flange joint or similar structure using the sealing injection nut 100 according to an embodiment.

At step 605 a leaking bolted flange joint is identified and the nut at the location of the leak is identified. At step 610, preferably the required calculations to ensure the safety of nut removal at the location of the leak are performed and, safety permitting, the nut is removed. At step 615, the sealant injection nut 100 suitable for the size bolt and application is provided. For instance, step 615 can include modifying the removed nut in accordance with the routine 500 shown in FIG. 5.

At step 620, the sealant injection nut 100 is installed onto the bolt from which the nut was removed and the nut is tightened to the prescribed specification, for instance, the torque specification for the particular type of bolted flanges.

At step 625, the sealant injection device is attached to injection fitting 130 of the sealant injection nut 100. As would be understood the sealant injection device can be any injection device configured to deliver a suitable sealant at a prescribed pressure through the injection fitting. At step 630, the compatible sealant compound is injected via the sealant injection nut 100 and into the flange until leakage stops or is minimized to a sufficient degree. If the leakage persists after a prescribed time or amount of sealant is injected, steps 605-625 can be repeated for the nearest nut, and so on, until leakage stops or is minimized to a sufficient degree. In addition or alternatively, multiple sealant injection nuts 100 can be installed at a time to stop the leakage.

At this juncture, it should be noted that although much of the foregoing description has been directed to a sealant injection nut and related methods for sealing leaking bolted flanges and other such devices, the systems and methods disclosed herein can be similarly deployed and/or implemented in scenarios, situations, and settings far beyond the referenced scenario.

It is to be understood that like numerals in the drawings represent like elements through the several figures, and that not all components and/or steps described and illustrated with reference to the figures are required for all embodiments or arrangements.

The flowchart and block diagrams in the figures illustrate the architecture, functionality, and operation of possible implementations of systems and methods according to various embodiments and arrangements. In this regard, each block in a flowchart or block diagrams as it relates to a computer implemented method can represent a module, segment, or portion of code, which comprises one or more executable instructions for implementing the specified logical function(s). It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A sealant injection apparatus to facilitate injecting sealant into a bolted flange joint of a fluid piping system of a type having a stud bolt mounted to a first flange and extending through a through hole in a second flange, the sealant injection apparatus comprising:
   a sealant injection nut, including:
      a metallic nut body having a sidewall with an outer sidewall surface and inner sidewall surface that surrounds a hollow generally cylindrical central opening, the nut body extending between a proximal end and a distal end,
         wherein a portion of the inner sidewall surface adjacent to the distal end is shaped to define a circumferential groove, the groove having a width that extends from the distal end toward the proximal end,
         wherein a portion of the inner sidewall surface between the groove and the proximal end is shaped to define threads, and wherein in use, the nut body is configured to be threaded onto the stud bolt and the distal end of the nut body is intended to be tightened against the second flange, and
         wherein the sidewall of the nut body is shaped to define a hollow passageway entirely through the sidewall, wherein an internal opening of the hollow passageway is located within the width of the circumferential groove;
      an injection fitting, wherein an internal end of the injection fitting is provided within the hollow passageway and sealingly attached to the nut body, wherein an external end of the injection fitting protrudes from the outer sidewall surface of the nut body; and
      an internal check valve provided within the passageway.

2. The sealant injection apparatus of claim 1, wherein an internal end of the groove is defined by a shoulder of a first thread among the threads and the external end of the groove is the distal end of the nut body, and wherein a diameter of the central opening between the first thread and the distal end is greater than or equal to a trough-to-trough diameter of the threads.

3. The sealant injection apparatus of claim 1, wherein a diameter of the central opening corresponding to the groove is greater than or equal to a diameter of the through hole in the second flange.

4. The sealant injection apparatus of claim 1, wherein the threads are sized and tapered to sealingly engage complementary threads of the stud bolt.

5. The sealant injection apparatus of claim 1, wherein the external end the injection fitting is configured to be connected to a sealant injector for injecting a sealant material into the injection fitting at an injection pressure, and wherein the injection fitting and the internal check valve are of a type that is suitable for passing the sealant material into the groove and are rated to operate at the injection pressure of the sealant injector and can sustain a prescribed leakage pressure of the piping system.

6. The sealant injection apparatus of claim 1, wherein walls of the passageway are threaded and wherein the injection fitting includes outer threads sized and shaped to sealingly engage with the threaded walls of the passageway.

7. The sealant injection apparatus of claim 1, wherein the nut body is a modified ASME standard nut rated for use with the bolted flange joint of the fluid piping system.

8. The sealant injection apparatus of claim 1, further comprising a sealant injector for injecting a sealant material into the injection fitting at an injection pressure.

9. The sealant injection apparatus of claim 8, further comprising the sealant.

10. A method for repairing a leaking bolted flange joint of a fluid piping system of the type having a stud bolt mounted to a first flange and extending through a through hole in a second flange using the sealant injection apparatus of claim 1, the method comprising:
    identifying the leaking bolted flange joint and an existing nut installed onto the stud bolt at the location of the leak;
    removing the nut from the stud bolt;
    providing a sealant injection apparatus of claim 1;
    threading the sealant injection apparatus onto the stud bolt until the distal end of the nut body abuts the second flange;
    tightening the sealant injection apparatus against the stud bolt and second flange according to prescribed torque specification;
    attaching a sealant injector to the injection fitting of the sealant injection apparatus; and
    injecting, using the sealant injector and at a prescribed injection pressure, a suitable sealant into the sealant injection apparatus and into internal passages of the bolted flange joint.

11. The method of claim 10, wherein the removed nut has a sidewall with an outer sidewall surface and inner sidewall surface that surrounds a hollow generally cylindrical central opening, the nut body extending between a proximal end and a distal end, and wherein the inner side wall between the distal end and proximal end is shaped to define threads, and wherein the step of providing the sealant injection apparatus comprises:
    machining a circumferential groove into a distal portion of the inner sidewall surface adjacent to the distal end of the nut, wherein the groove has a width that extends from the distal end toward the proximal end, and wherein machining the groove includes removing any threads and material from the inner sidewall surface sufficient to provide the groove with the width and a prescribed diameter,
    drilling a hollow passageway entirely through the sidewall between the outer sidewall surface and the inner sidewall surface, wherein an internal opening of the hollow passageway is located within the width of the circumferential groove, and
    installing an internal check valve and an injection fitting at least partially into the passageway, wherein an internal end of the injection fitting is provided within the hollow passageway and sealingly attached to the nut body, and wherein an external end of the injection fitting protrudes from the outer sidewall surface of the nut body, and wherein the internal check valve is provided within the passageway and sealingly attached to the nut body.

12. The method of claim 10, further comprising, if leakage from the bolted flange joint is not minimized to a sufficient degree after the injecting step, repeating the removing through injecting steps for an adjacent nut.

13. The method of claim 10, wherein the injecting step is performed at least until leakage is reduced at least a prescribed degree.

14. A method of manufacturing a sealant injection apparatus to facilitate injecting sealant into a bolted flange joint of a fluid piping system of a type having a stud bolt mounted to a first flange and extending through a through hole in a second flange, the method comprising:
   providing a metallic nut, the metallic nut having a nut body including a sidewall with an outer sidewall surface and inner sidewall surface that surrounds a hollow generally cylindrical central opening, the nut body extending between a proximal end and a distal end, and wherein the inner sidewall surface between the distal end and proximal end is shaped to define threads,
   machining a circumferential groove into a distal portion of the inner sidewall surface adjacent to the distal end, wherein the groove has a width that extends from the distal end toward the proximal end, and wherein machining the groove includes removing any threads and material from the inner sidewall surface sufficient to provide the groove with the width and a prescribed diameter,
   drilling a hollow passageway entirely through the sidewall between the outer sidewall surface and the inner sidewall surface, wherein an internal opening of the hollow passageway is located within the width of the circumferential groove; and
   installing an internal check valve and an injection fitting at least partially into the passageway, wherein an internal end of the injection fitting is provided within the hollow passageway and sealingly attached to the nut body, and wherein an external end of the injection fitting protrudes from the outer sidewall surface of the nut body, and wherein the internal check valve is provided within the passageway and sealingly attached to the nut body.

15. The method of claim 14, further comprising: tapping a wall of the nut body surrounding the passageway with threads, and wherein installing the injection fitting includes threading the injection fitting into the threaded passageway.

16. The method of claim 15, wherein a diameter of the central opening corresponding to the groove is greater than or equal to a diameter of the through hole in the second flange.

17. The method of claim 14, wherein the groove is machined into the inner sidewall surface of the nut such that an internal end of the groove is defined by a shoulder of a first thread among the threads and the external end of the groove is the distal end of the nut body, and wherein a diameter of the central opening between the first thread and the distal end is greater than or equal to a trough-to-trough diameter of the threads.

18. The method of claim 14, wherein the nut has threads are sized and tapered to sealingly engage complementary threads of the stud bolt.

19. The method of claim 14, further comprising: selecting the injection fitting in accordance with the type of bolted flange and the fluid piping system, wherein the injection fitting and the internal check valve are of a type that is suitable for passing the sealant material into the groove and are rated to operate at an injection pressure of a sealant injector and can sustain a prescribed leakage pressure of the piping system.

20. The method of claim 14, wherein the nut is an ASME standard nut rated for use with the bolted flange joint of the fluid piping system.

* * * * *